_(12)_ United States Patent
Sporel

(10) Patent No.: US 9,483,369 B2
(45) Date of Patent: Nov. 1, 2016

(54) METHOD AND APPARATUS FOR FAILOVER DETECTION AND RECOVERY USING GRATUITOUS ADDRESS RESOLUTION MESSAGES

(71) Applicant: Verizon Patent and Licensing Inc., Basking Ridge, NJ (US)

(72) Inventor: Eric Sporel, Westford, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 377 days.

(21) Appl. No.: 14/163,166

(22) Filed: Jan. 24, 2014

(65) Prior Publication Data

US 2015/0212909 A1 Jul. 30, 2015

(51) Int. Cl.
*G06F 11/20* (2006.01)
*G06F 11/16* (2006.01)
*H04L 29/12* (2006.01)

(52) U.S. Cl.
CPC ....... *G06F 11/2023* (2013.01); *G06F 11/1658* (2013.01); *G06F 11/2028* (2013.01); *G06F 11/2038* (2013.01); *G06F 11/2043* (2013.01); *H04L 61/103* (2013.01)

(58) Field of Classification Search
None
See application file for complete search history.

(56) References Cited

U.S. PATENT DOCUMENTS

| | | | | | |
|---|---|---|---|---|---|
| 6,049,825 | A | * | 4/2000 | Yamamoto | H04L 12/2856 709/220 |
| 6,108,300 | A | * | 8/2000 | Coile | G06F 11/2005 340/2.9 |
| 2002/0083036 | A1 | * | 6/2002 | Price | G06F 11/2028 |
| 2004/0268175 | A1 | * | 12/2004 | Koch | H04L 67/1034 714/4.11 |
| 2006/0206611 | A1 | * | 9/2006 | Nakamura | G06F 11/2028 709/226 |
| 2006/0245411 | A1 | * | 11/2006 | Chen | G06F 11/008 370/350 |
| 2007/0070975 | A1 | * | 3/2007 | Otani | G06F 11/2007 370/351 |
| 2008/0120177 | A1 | * | 5/2008 | Moscirella | G06F 11/2023 705/14.12 |
| 2008/0244281 | A1 | * | 10/2008 | Felter | G06F 1/28 713/300 |
| 2009/0037763 | A1 | * | 2/2009 | Adhya | H04L 12/4641 714/4.12 |
| 2009/0037998 | A1 | * | 2/2009 | Adhya | G06Q 20/027 726/11 |
| 2010/0271933 | A1 | * | 10/2010 | Li | H04L 45/00 370/219 |
| 2011/0271136 | A1 | * | 11/2011 | Abbot | G06F 11/2023 714/2 |
| 2013/0185416 | A1 | * | 7/2013 | Larkin | H04L 61/103 709/224 |
| 2014/0289399 | A1 | * | 9/2014 | Shimokuni | G06F 11/301 709/224 |
| 2014/0317440 | A1 | * | 10/2014 | Biermayr | H04L 41/0668 714/4.11 |
| 2015/0081767 | A1 | * | 3/2015 | Evens | H04L 67/30 709/203 |

OTHER PUBLICATIONS

How does gratuitous ARP work? Network Engineering Stack Exchange. May 2, 2014 [retrieved on Mar. 23, 2016]. Retrieved from the Internet <URL: http://networkengineering.stackexchange.com/questions/7713/how-does-gratuitous-arp-work>.*
Bhide, Anupam. Elnozahy, Elmootazbellah. Morgan, Stephen. A Highly Available Network File Server. Proceedings of the Winter USENIX Conference. 1991.*
What is Gratuitous ARP? Jul. 16, 2014 [retrieved on Mar. 23, 2016]. Retrieved from the Internet <URL: https://supportforums.cisco.com/discussion/12257536/what-gratuitous-arp>.*

* cited by examiner

*Primary Examiner* — Gabriel Chu
*Assistant Examiner* — Paul Contino

(57) ABSTRACT

An approach for efficient failover detection includes detecting an attempt by a first server to transition from a standby mode to an active mode, diagnosing a loss of connectivity to the first server in a control plane as a cause of the attempt, and transitioning to a standby mode based on the diagnosed cause of the attempt.

20 Claims, 11 Drawing Sheets

METHOD AND APPARATUS FOR FAILOVER DETECTION AND RECOVERY USING GRATUITOUS ADDRESS RESOLUTION MESSAGES

BACKGROUND INFORMATION

Consumer demand for Internet services has led to the widespread deployment of application services by service providers in nearly every industry. The growth of such application services has also led to the growth of increasingly complex hardware and software systems supporting a wide assortment of end-user devices and computing environments. Despite their increasingly complex and diverse computing needs, service providers must nevertheless satisfy consumer demand for reliable and continuous access to applications. Maintaining high levels of service availability has led to the widespread use of redundant application and server configurations in which an application service fails over to one or more standby servers if an active server fails. However, the failover process is susceptible to instability if a fault affects the control plane between the active and standby servers.

Based on the foregoing, there is a need for efficient failover detection and recovery.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for efficient failover detection and recovery, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to efficient failover detection and recovery for a telecommunications service provider, it is contemplated that these embodiments have applicability to systems operated by different organizations and to other operations wherein application services are provided.

Figure 1A:
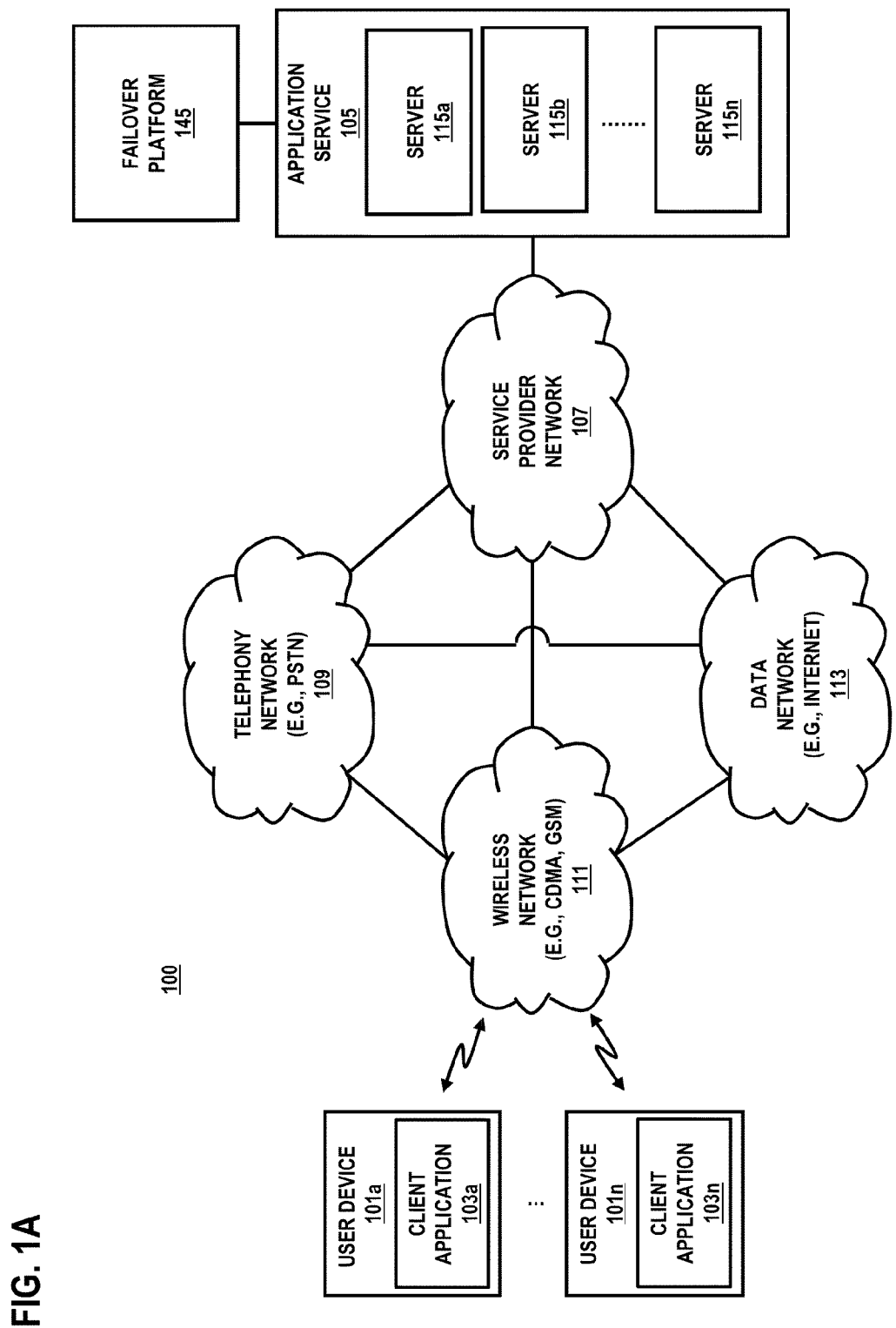
FIG. 1A is a diagram of a system capable of efficient failover detection and recovery, according to an exemplary embodiment.

FIG. 1A illustrates a system 100 capable of efficient failover detection and recovery, according to an exemplary embodiment. System 100 includes one or more user equipment (UE) 101a-101n (collectively referred to as UE 101). UE 101 may include client applications 103a-103n (collectively referred to as client applications 103). As used herein, the term "client" may be used to refer to computer programs designed to operate according to a client-server model of computing. Client applications 103 may communicate and access application service 105 via networks 107-113.

For illustrative purposes, networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, service provider network 107 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

According to exemplary embodiments, UE 101 may be utilized to communicate over system 100 and may include any computing device capable of sending and/or receiving information over one or more of networks 107-113. For instance, UE 101 may include mobile devices (or terminals) which may be any cellular phones, radiophones, satellite phones, smart phones, wireless phones, or any other suitable mobile devices, such as personal digital assistants (PDAs), pocket personal computers, tablets, customized hardware, etc. Further, computing devices may include Voice over Internet Protocol (VoIP) phones, skinny client control protocol (SCCP) phones, session initiation protocol (SIP)

phones, Internet Protocol (IP) phones, personal computers, softphones, workstations, terminals, servers, etc.

As used herein, the term "application service" refers to the combination of servers, network devices, and server-side applications and operating system components that together constitute a software service. For instance, application service 105 is hosted at one or more servers 115a-115n (collectively referred to as servers 115). The components of application service 105 may include server hardware, networks interconnecting the servers to each other and to networks 107-113, application software running on servers 115, and operating system or virtualization software. In one embodiment, application service 105 is engineered to provide a fault-tolerant software system. Fault tolerance refers to the attribute of a system that provides continuous service in the presence of faults. Different fault tolerance techniques exist to circumvent various kinds of failures. Hardware fault tolerance may be achieved through the use of redundant elements (e.g., multiple servers); software fault tolerance may be achieved through error checking, duplication of data, and software design practices. To achieve hardware fault tolerance, one or more software elements may coordinate the fault detection and recovery phases. For example, middleware and distributed software components may be implemented at each of servers 115. Application service 105 may also rely heavily on replicated databases that are a part of or connected to servers 115. In one embodiment, middleware may ensure the synchronization of software execution states across one or more redundant servers.

It is contemplated that the server applications may be hosted, or otherwise programmed, using various application and/or server configurations to ensure a high level of availability. As used herein, the term "availability" or "high availability (HA)" may be used to refer to computer hardware or software systems that are capable of providing service most of the time. Availability may be quantified in terms of the number of "9s" or "nines." A system (e.g., typical desktop or server) with "3 nines" refers to a 99.9% availability, which roughly corresponds to nine hours of unavailability (also referred to herein as "downtime" or "outage") per year. A system (e.g., enterprise server) with "4 nines" refers to a 99.99% availability, which roughly corresponds to one hour of downtime per year. A system (e.g., carrier class server) with "5 nines" refers to 99.999% availability, which roughly corresponds to five minutes of downtime per year. Finally, a system (e.g., carrier switch equipment) with "6 nines" refers to a 99.9999% availability, which roughly corresponds to thirty-one seconds of downtime per year. To ensure end-user satisfaction, application providers try to design systems such that the duration and frequency of outages is low enough for end-users not to perceive the outages as a problem. That is, application providers design system availability to ensure end-user perception of a high degree of service availability.

Figure 1B:
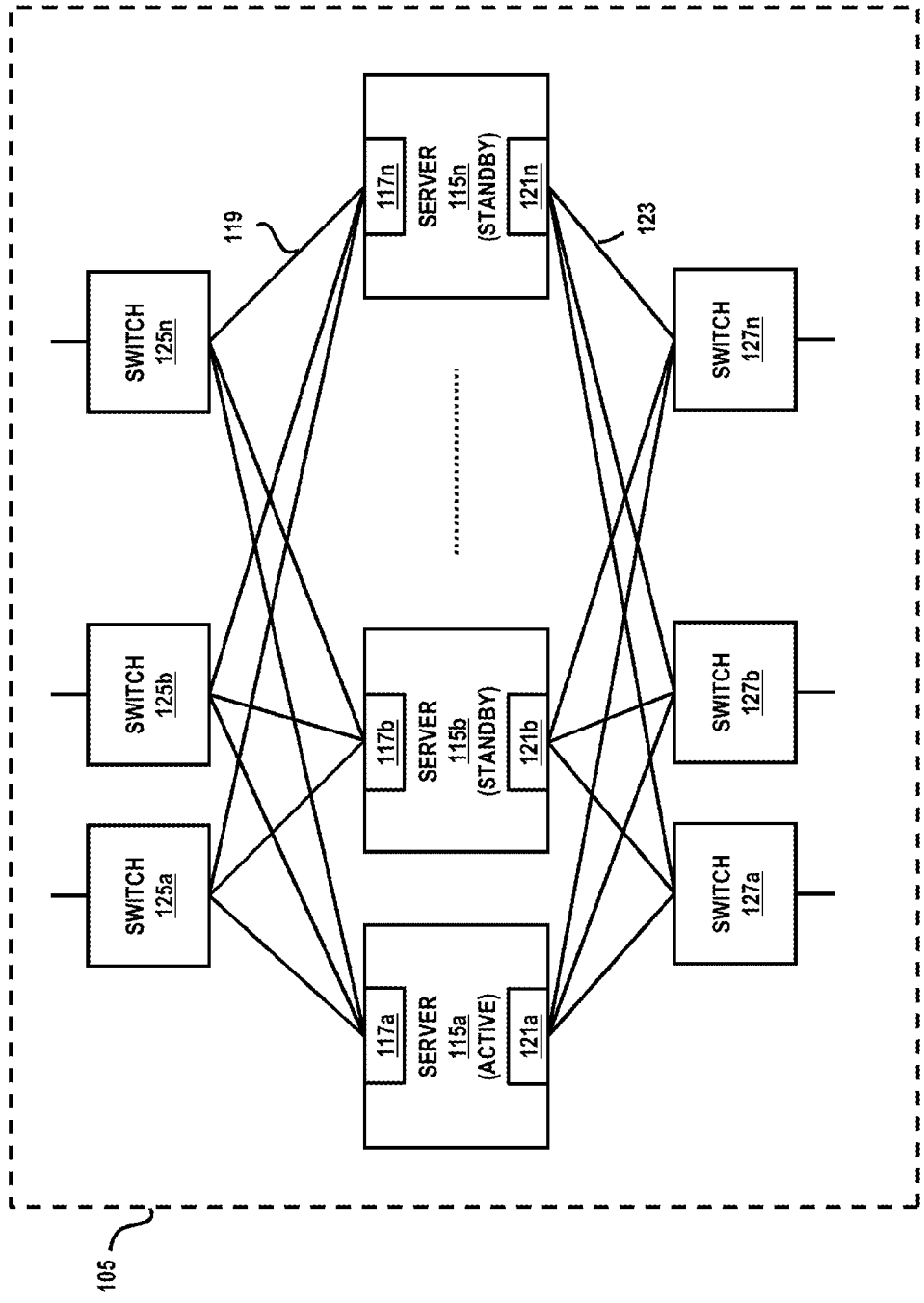
FIG. 1B is a diagram of a high-availability network architecture for an application service, according to an exemplary embodiment.

FIG. 1B is a diagram of a high-availability network architecture for an application service, according to an exemplary embodiment. In one embodiment, application service 105 is deployed in a computer cluster—a high-availability system made up of plural "nodes," each node including a complete computer system containing hardware, operating system, and communication capabilities. For example, servers 115 of application service 105 may form a cluster. Clusters may be homogeneous or heterogeneous. For instance, servers 115 may be identical and form a homogeneous cluster. Alternatively, servers 115 may have different components and form a heterogeneous cluster. Although reference may be made to nodes as being servers, it is contemplated that the present disclosure is not limited to servers and may include any computing system or device that employs redundancy measures for fault tolerance.

In one embodiment, fault tolerance may be provided by only using one of the servers in a cluster at one time. The remaining servers are not used until the primary server fails. Upon failure, the primary server is disabled or "fails over" and one of the other servers becomes active. As used herein, the terms "active" or "active mode" and "standby" or "standby mode" may be used to describe a primary server and one or more backup servers, respectively. An application service with only one active and one standby server may be described as "1+1" redundancy. An application service with more than one of active and standby servers may be described as "N+M" redundancy, where N is the number of active servers and M is the number of standby servers. In one embodiment, an active server is one that is actively responding to incoming client requests. The active server performs synchronization and replication to the standby servers. Standby servers track or otherwise monitor the active server. In case of a failover, the standby server begins handling incoming client requests with minimal or no service disruption.

In one embodiment, server 115a operates in an active mode and servers 115b-115n are in standby mode. Thus, server 115a may be described as the active server and servers 115b-115n may be described as standby servers. If server 115a fails, one (or more) of servers 115b-115n may transition to an active mode. Once server 115a recovers from the failure, server 115a may become another standby server. Alternatively, server 115a may force a failover such that it again becomes the active server and servers 115b-115n revert to standby mode. As used herein, the term "failure" may refer to a deviation from expected behavior that, unless corrected, impacts the availability or quality (e.g., delay, appearance, etc.) of an application service. The term "fault" may be used to more particularly describe a cause of a failure. For instance, a fault may include technical issues such as equipment or device malfunctions.

As shown, servers 115 may be connected by one or more networks. In one embodiment, each server maintains two network interfaces. Network interfaces 117a-117n (collectively referred to as network interfaces 117) connect to a network 119 that handles customer traffic (also referred to herein as "data plane"). Network interfaces 121a-121n (collectively referred to as network interfaces 121) connect to network 123 that handles operation, administrative and management traffic (also referred to herein as "control plane"). For example, network 119 may be utilized by UE 101 to access application service 105 and network 123 may be utilized by servers 115 to exchange data/state replication, process synchronization, and system monitoring traffic. The data plane and control plane networks may be separate networks (as shown). Alternatively, in one embodiment, the data plane and control plane networks utilize the same physical network infrastructure, but may occupy different logical or virtual partitions of the infrastructure.

In one embodiment, networks 119 and 123 are fault-tolerant networks. For example, network 119 may employ an N+M redundancy built using switches 125a-125n (collectively referred to as switches 125). In case one switch (e.g., switch 125a) fails, one or more of switches 125b-125n may take over the switching functions. Network 123 may similarly be a fault-tolerant network employing extra redundancy switches 127a-127n (collectively referred to as switches 127). In one embodiment, networks 119 and 123 are high-speed gigabit Ethernet™ networks.

UE 101 may access application service 105 via a virtual network address shared by servers 115. The virtual network address is a publicly accessible address that resolves to the hardware address of the current active server. In one embodiment, the virtual network address is a public IP address (i.e., routable via networks 107-113) that resolves via an address resolution process to the MAC address of the active server (e.g., server 115a). For example, each switch maintains the hardware address information of the current active server in an address resolution cache that is updated whenever a server failover occurs. In one embodiment, servers 115 and switches 125, 127 may utilize a gratuitous address resolution message to update the hardware address associated with the virtual network address. For example, networks 119 and 123 may utilize the ARP protocol to control hardware address caches. A gratuitous address resolution message may refer to an unsolicited message containing address resolution information. In one embodiment, the server attempting to transition to an active mode may broadcast or multicast such a message onto a network in order to force all devices connected to the network to update their cache information. For example, a standby server may broadcast a gratuitous ARP message when a failover occurs in order to cause client requests to be forwarded to the standby server after it has transitioned to active mode. The gratuitous ARP message forces switches 125 and 127 to remove an entry for the failed server and insert a new entry associating the virtual IP address with the hardware address of the standby server.

Following a failover, application service 105 migrates from the faulty server to one of the standby servers. In the process, the standby server becomes the new active server. In one embodiment, the application data and critical state information has been replicated across all servers 115 beforehand such that the failover is transparent to UE 101. The application data may be stored locally by each of the servers or on separate databases (not shown). In one embodiment, data replication/duplication, state preservation and synchronization activities are conducted via a control plane network (e.g., network 123). As described next in relation to FIG. 1C, servers 115 may include various operating system and middleware software components that are utilized for replication/synchronization across servers 115.

Figure 1C:
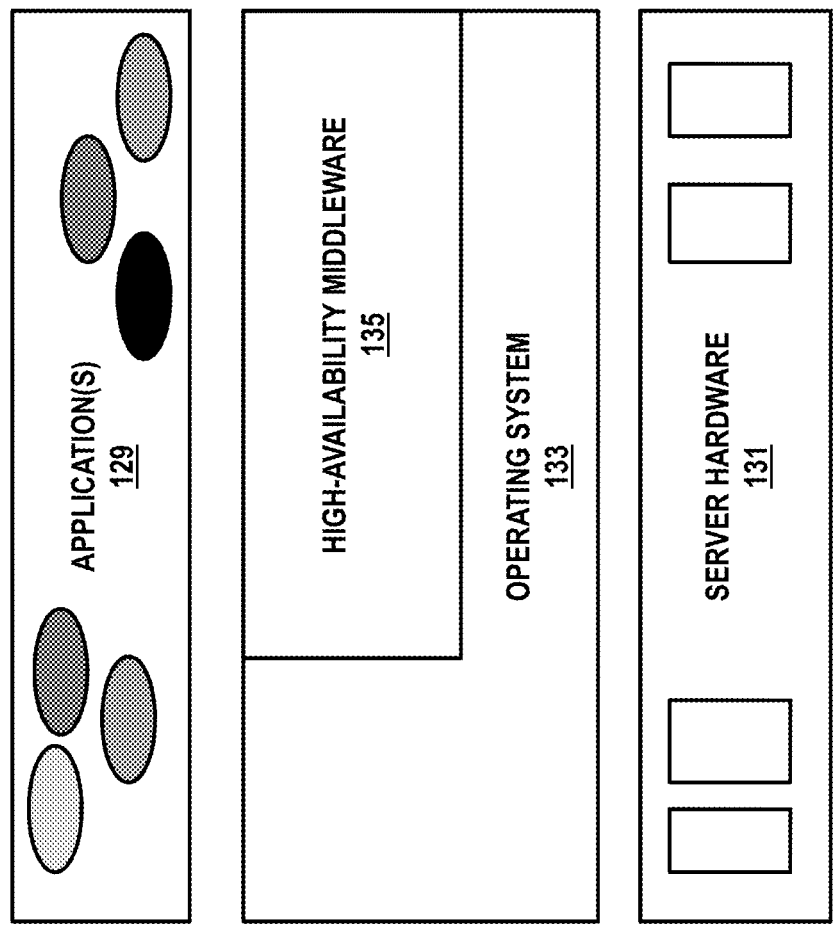
FIG. 1C is a diagram of an application server, according to an exemplary embodiment.

FIG. 1C is a diagram an application server, according to an exemplary embodiment. In one embodiment, each of servers 115 may be decomposed into server applications 129 (also referred to as "applications 129"), server hardware 131, operating system 133, and high-availability middleware 135. Server hardware 131 may include the entire set of hardware, firmware, etc. normally provided by a hardware system vendor to support an operating system (e.g., Windows, Linux, etc.). Operating system 133 provides basic process scheduling and resource control for server applications 129 and high-availability middleware 135. For example, operating system 133 may control the provisioning of device drivers for software access to server hardware 131. In one embodiment, operating system 133 includes network interface devices drivers that monitor connectivity to other servers and alert operating system 133, high-availability middleware 135, and server applications 129 of network failures.

In one embodiment, server hardware 131 and operating system 133 include internetworking components (not shown) that allow servers 115 to share a virtual network address. As described earlier, client devices may access application service 105 at the virtual network address. For example, application service 105 may be accessed by UE 101 at a single public IP address. In one embodiment, the virtual network address is an IP address associated with the active server. Address resolution information shared by servers 115 and switches 125 associates the virtual network address with the hardware address of the active server so that all customer traffic is forwarded to the active server. If the active server fails, one of the standby servers transitions to an active mode and sends a gratuitous address resolution message to associate itself with the virtual network address.

High-availability middleware 135 may reside in each server to coordinate fault-tolerance activities across servers 115. In one embodiment, high-availability middleware 135 includes database management and state preservation functions. The middleware software may, for instance, contain direct interfaces to operating system 133 and to hardware devices (accessed through operating system 133 via device drivers). In one embodiment, high-availability middleware 135 makes decisions whether and when to replicate application data and state variables.

Applications 129 may or may not be aware of other instances of the application executing on other servers. For example, high-availability middleware 135 may transparently perform data and state replication. In one embodiment, high-availability middleware 135 may access the application data and state information on each server and ensure that the data and state information is identical. High-availability middleware 135 may also synchronize execution checkpoints and state variables of standby servers to the active server. Alternatively, the replication and synchronization activities may occur from an active server to one or more standby servers.

Although reference is made herein to a model of an application server in which the operating system runs directly on the platform hardware, it is contemplated that the operating system may also run within a virtualized environment. In one embodiment, applications 129, high-availability middleware 135, and operating system 133 may execute within a virtual machine (VM) running on a hypervisor or other virtualization software. It is contemplated that virtual application servers may take advantage of efficient failover and recovery as described in the present disclosure.

Figure 1D:
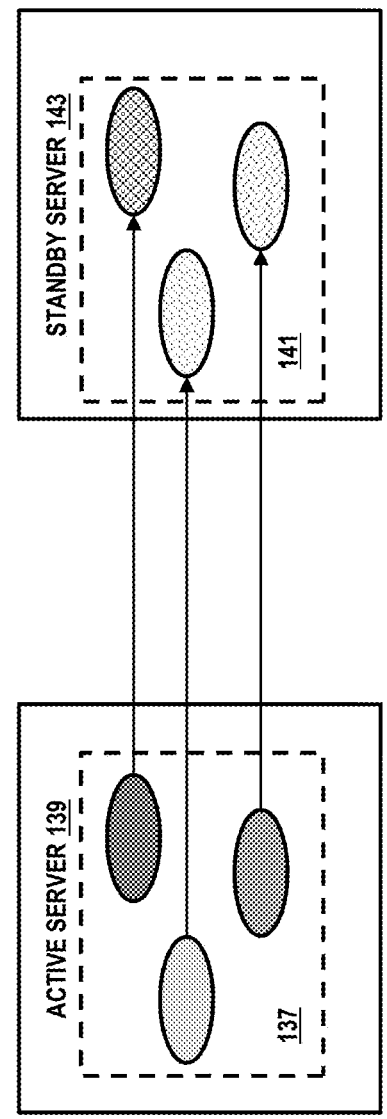
FIG. 1D is a diagram for a high-availability application service, according to an exemplary embodiment.

FIG. 1D is a diagram of a high-availability application service, according to an exemplary embodiment. In one embodiment, server applications instances are actively aware of their current state as being in active or standby mode. For example, each application may maintain or have access to critical state information of the server it is executing on. In one embodiment, the server application may directly interface with high-availability middleware 135 to obtain the current status of all servers belonging to application service 105. If a server failover occurs, the application may receive an indication from high-availability middleware 135 or operating system 133 that the server is about to transition to an active or standby mode. Based on this indication, the application may restore any preserved state and data from a database and synchronize the point of its execution to that of a stored checkpoint. As a result, a seamless transition occurs in which all of the data and process states are identically recreated on a standby server with minimal service disruption.

In one embodiment, application instances 137 on active server 139 drive the synchronization and replication with application instances 141 on standby server 143. Each application instance may perform some sort of data replication and state synchronization with its corresponding standby instance. Rapid synchronization and replication of databases and state information, for instance, may occur via a control plane. Replication may be synchronous or asynchronous. Synchronous replication, for instance, may be implemented by means of atomic data write operations (i.e., either a write occurs on both or neither of servers 139 and 143). Synchronous replication may be desirable to ensure zero data loss, but may lead to service disruptions if a control plane failure occurs. In another embodiment, asynchronous (i.e., write operation is considered complete as soon as local storage acknowledges it) or semi-synchronous (i.e., write operation is considered complete as soon as local storage acknowledges it and a standby server acknowledges that it has received the write into memory or log file) replication may be implemented. The present disclosure is independent of the particular form of replication utilized.

The approach of system 100 stems, in part, from the recognition that there may be situations where an active server has not failed, but a standby server may mistake a failure affecting communication via the control plane for a failure of the active server. Such failures may create an undesirable feedback loop that causes the servers to alternatively failover without reaching a stable state. For example, a fault affecting network 119 may cause the active server (e.g., server 115*a*) to perform repeated failovers with a standby server (e.g., server 115*b*). Unable to communicate via the control plane, each server will transition to the active mode and broadcast a gratuitous address resolution message to take ownership of the virtual network address. In this manner, both servers 115*a* and 115*b* may alternatively control the virtual network address and neither server stably transitions to a standby mode. Furthermore, replication and synchronization of critical state information is interrupted during this period because neither server stably transitions to the active mode.

To address these problems, system 100 utilizes failover platform 145 to implement an efficient failover and recovery mechanism in case of a control plane fault. This may be achieved by a method including: detecting an attempt by a first server to transition from a standby mode to an active mode, diagnosing a loss of connectivity to the first server in the control plane as a cause of the attempt, and causing a second server to transition from an active mode to a standby mode based on the diagnosed cause of the attempt.

As used herein, "diagnosis" may be used to refer to an analysis of one or more events and system parameters to determine the nature and location of a reported fault. In one embodiment, the second server (e.g., server 115*a*) may determine the receipt of one or more gratuitous ARP messages broadcast by the first server (e.g., server 115*b*) as being related to a fault in the control plane (e.g., network 123) connecting the first and second servers. For example, the second server may determine that the first server is attempting to transition to the active mode because it no longer sees the second server via the control plane. In one embodiment, a device driver for a network interface reports that a network fault has occurred in the control plane. The fault may also interfere with one or more data/state replication processes, which also may report a fault. In one embodiment, the second server may transition to a standby mode and allow the first server to transition to an active mode.

As described above, the second server may receive one or more gratuitous address resolution messages from the first server via a data plane (e.g., data network 119). The data plane may refer to a high-speed LAN (e.g., gigabit Ethernet™) to which both the first and second servers are connected. In one embodiment, the data plane may include a highly reliable, fault tolerant fabric switching network infrastructure with redundant network links. Such a network infrastructure may employ high-speed LAN switches that can be rapidly re-programmed. For example, the receipt of a gratuitous ARP message may cause the switches and the network interfaces of servers 115 to clear an existing address resolution entry in an ARP cache and re-program it with a new entry based on the first server's MAC address.

In one embodiment, the second server determines a failure to synchronize to one or more applications at the first server via the control plane. For instance, high-availability middleware 135 of the second server (e.g., server 115*a*) may unsuccessfully attempt to replicate application data and critical state information to the first server (e.g., server 115*b*). In one embodiment, high-availability middleware 135 of the second server (e.g., server 115*a*) may attempt to communicate with the first server (e.g., server 115*b*), but may receive an error message from operating system 133.

In one embodiment, the second server (e.g., server 115*a*) may utilize the information of the received gratuitous ARP message and the information indicating that replication of critical state information via the control plane was unsuccessful to determine that the first server (e.g., server 115*b*) is attempting to transition to the active state because of a failure in the control plane. The second server (e.g., server 115*a*) may then transition from its current active mode to a standby mode, thereby allowing the first server (e.g., server 115*b*) to stably transition to active mode. In one embodiment, the second server (e.g., server 115*a*) may remain in standby mode until it detects a resumption of connectivity in the control plane. The second server (e.g., server 115*a*) may then re-synchronize its application data and critical state information with the first server (e.g., server 115*b*). In one embodiment, the second server (e.g., server 115*a*) may force a failover to return to active mode.

Figure 2:
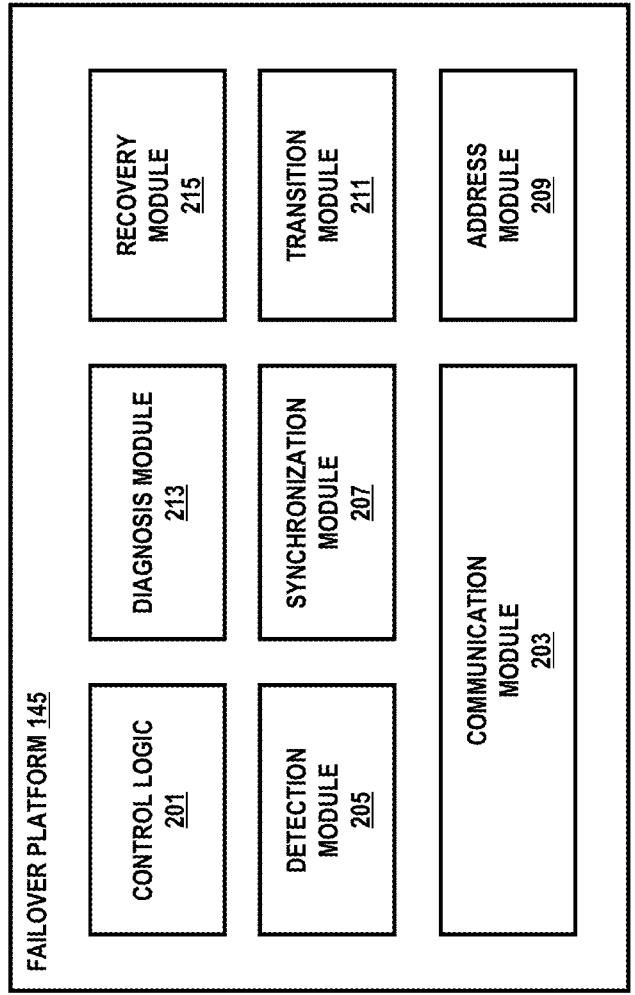
FIG. 2 is a diagram of a failover platform capable of efficient failover detection and recovery, according to an exemplary embodiment.

FIG. 2 is a diagram of the components of failover platform 145, according to an exemplary embodiment. By way of example, failover platform 145 includes one or more components for providing efficient failover detection and recovery services. It is contemplated that the functions of these components may be combined in one or more components or performed by other components of equivalent functionality. In one embodiment, failover platform 145 may be a part of a high-availability middleware component on each server belonging to an application service. Alternatively, failover platform 145 may reside on a separate computer system connected to the servers of an application service via a control plane or a data plane (or via a special management plane). In this embodiment, failover platform 145 includes control logic 201, communication module 203, detection module 205, synchronization module 207, address module 209, transition module 211, diagnosis module 213, and recovery module 215.

Control logic 201 provides the logic for executing one or more processes and storing information generated by the various modules. In one embodiment, identical instances of control logic 201 reside at each of servers 115 and are activated when the server transitions to an active mode. Alternatively, or in addition, control logic 201 may reside on a separate system connected to each of the servers 115 and networks 119 and 123. If a failure affects connectivity at the control plane, control logic 201 helps a stable transition of a standby server to an active mode. Once connectivity at the control plane resumes, control logic 201 may cause the standby server to revert to standby mode.

Communication module 203 may be utilized to transmit or receive messages via the data and control planes. In one embodiment, communication module 203 interacts or includes components of operating system 133 that perform device driver functions for a server. Communication module 203 may, for instance, be utilized to send broadcast, multicast, or unicast messages via one or more network interfaces of a server. In one embodiment, communication module 203 may also be utilized to alert or report the receipt of messages to an application, operating system component, or middleware. For instance, communication module 203 may report the receipt of a gratuitous ARP message received from a standby server attempting to transition to an active mode. Control logic 201 may utilize the report to trigger other modules of failover platform 145 to take appropriate diagnostic or recovery actions.

Detection module 205 may be utilized to detect an attempt by a standby server to transition to an active mode. In one embodiment, detection module 205 determines that a standby server is attempting to transition from a standby to an active mode based on the receipt of one or more gratuitous ARP messages from the standby server. Detection module 205 may receive a report of such messages from communication module 203. In response, detection module 205 may interact with one or more other modules (e.g., diagnosis module 213) to help determine whether a feedback loop has been or will be created.

Synchronization module 207 may be utilized to synchronize the instances of one or more applications provided as a service at the active and standby servers. In one embodiment, synchronization module 207 performs replication of data and critical state information related to the operation of the applications. For instance, synchronization module 207 may perform either synchronous or asynchronous replication with respect to one or more databases connected to (or a part of) servers 115. In one embodiment, synchronization occurs via a control plane. For instance, synchronization module 207 may interact with communication module 203 to exchange replicated data and critical state information via network 123.

Address module 209 may be utilized to manage one or more virtual network addresses at which an application service (e.g., application service 105) is accessible. For instance, the virtual network addresses may be publicly routable IP addresses distributed via networks 107-113 to UE 101. In one embodiment, address module 209 manages the network-to-hardware address resolution of a virtual network address. For instance, address module 209 may cause communication module 203 to broadcast a gratuitous ARP message whenever the active server changes. A network device forwarding packets addressed to the virtual network address must accurately resolve the network address to the actual hardware of the active server. In one embodiment, address module 209 updates the hardware address the virtual network address is resolved to by broadcasting the updated information to switches 125 on network 119. Based on the information contained within the broadcast, switches 125 and other servers update their respective cached address information. For instance, the gratuitous ARP message may indicate a new hardware address to be associated with the virtual network address. Based on this information, a receiving server or network device may create or modify an entry in its routing/forwarding tables.

Transition module 211 may be utilized to change the state of a server or an application executing at a server from active to standby mode or vice versa. In one embodiment, communication module 203 is a part of a high-availability middleware that interfaces with the server operating system (e.g., operating system 133) and the hosted application (e.g., applications 129). In one embodiment, transition module 211 performs various state preservation functions for an instance of the application running on a server that is about to transition. In one embodiment, high-availability middleware 135 performs a coordinated failover of the application by synchronizing each of the instances of the application running on the various servers prior to transitioning. In cases where the transition is triggered by a control plane fault, transition module 211 may be limited to performing state preservation with respect to a local storage. For instance, critical application data and state information may be saved to local volatile or non-volatile media.

Diagnosis module 213 may be utilized to diagnose a fault in the control plane as a cause of an attempt by a standby server to transition to an active mode. In one embodiment, diagnosis module 213 receives an indication from communication module 203 that the control plane has suffered a fault. Alternatively, or in addition, diagnosis module 213 may receive notification from synchronization module 207 that a replication or state synchronization step has been unsuccessful because of a control plane failure. If diagnosis module 213 also learns of a standby server attempting to transition to an active mode, diagnosis module 213 may inferentially determine that the control plane fault reported by communication module 203 or synchronization module 207 is the cause of the attempted transition. In one embodiment, diagnosis module 213 may learn of the standby server's attempted transition based on receipt of one or more gratuitous address resolution messages from the standby server. In another embodiment, diagnosis module 213 may first learn of the receipt of one or more gratuitous address resolution messages before learning of a control plane fault. For example, diagnosis module 213 may proactively check whether any faults have been reported for the control plane upon receipt of a gratuitous address resolution message. If there are reports of issues affecting connectivity to the standby server that is transmitting the gratuitous address resolution messages, diagnosis module 213 may diagnose the cause of the attempt to be related to the control plane fault.

Diagnosis module 213 may utilize transition module 211 to force the active server to failover if diagnosis module 213 determines that the standby server is attempting to transition to active mode because it can no longer communicate with the active server. After a failover occurs, diagnosis module 213 may periodically check if the control plane fault has been repaired. If the fault is repaired, diagnosis module 213 may utilize recovery module 215 to cause the server that was originally active to revert to active mode.

Recovery module 215 may be utilized for full recovery to occur once connectivity via the control plane is restored. In one embodiment, a full recovery may mean restoration of the respective modes of servers belonging to an application service to their original modes prior to the occurrence of the control plane failure. Recovery module 215 may, for instance, force such a recovery if it receives an indication that communication via the control plane has resumed. Recovery module 215 may then utilize synchronization module 207 to re-synchronize state information and replicate all data between the instances of the application running on servers 115. In one embodiment, recovery module 215 may utilize transition module 211 to transition back to an active mode. As described above, transition module 211 may, in turn, utilize address module 209 and communication module 203 to broadcast one or more other gratuitous address resolution messages via the data plane.

In another embodiment, recovery module 215 may be utilized to perform a partial recovery even if the control plane fault continues to affect communication among the servers. For instance, application service 105 may rely on asynchronous or semi-synchronous replication techniques. In such cases, recovery may simply entail a failover to a standby server. Recovery module 215 may still utilize transition module 211 to cause the transition of the active server to standby mode, but may not require the server to transition back to active mode when the control plane fault is repaired.

Figure 6:
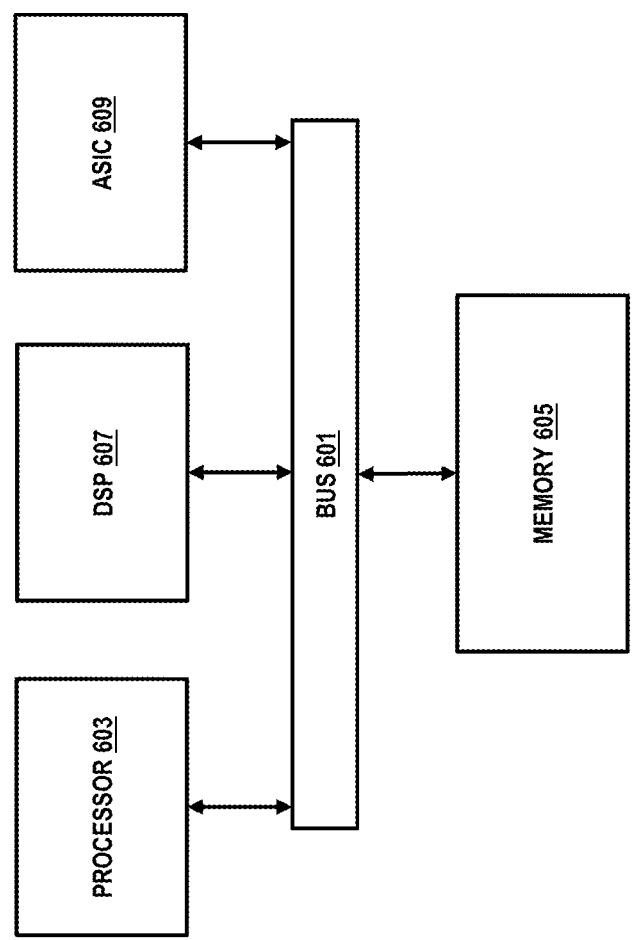
FIG. 6 is a diagram of a chip set that can be used to implement various exemplary embodiments.

FIGS. 3A through 3D illustrate flowcharts for efficient failover, according to an exemplary embodiment. In one embodiment, failover platform 145 performs the processes illustrated in FIGS. 3A through 3D and are implemented in, for instance, a chip set including a processor and a memory as shown in FIG. 6.

Figure 3A:
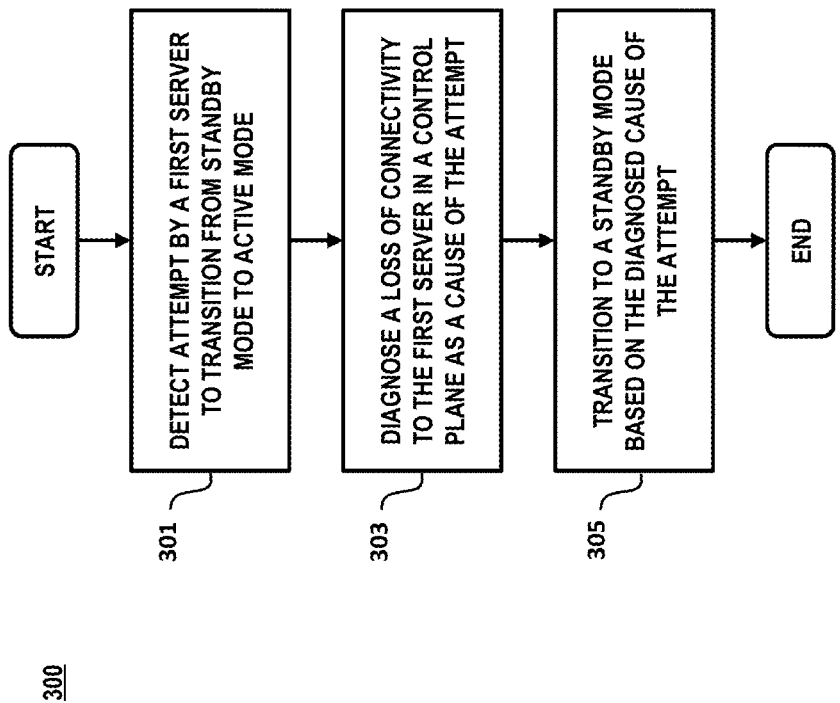
FIGS. 3A through 3D are flowcharts of processes for efficient failover detection and recovery, according to an exemplary embodiment.

FIG. 3A illustrates a process 300 for efficient failover detection and recovery, according to an exemplary embodiment. In step 301, an attempt by a first (currently standby) server to transition from a standby mode to an active mode is detected by a second (currently active) server. In one embodiment, detection module 205 of failover platform 145 may report the attempted transition to diagnosis module 213. In step 303, the second (active) server may diagnose a loss of connectivity to the first (standby) server in the control plane as the cause of the attempted transition. In one embodiment, diagnosis module 213 of failover platform 145 receives information of the control plane failure and correlates this information with the attempted transition. In step 305, the second server transitions to a standby mode based on the diagnosed cause of the attempt by the first server to transition to active mode. If the failover platform 145 is implemented as separate computer system, then upon detection of the attempt by the first (standby) server to transition from standby to active, the control logic 201 of the failover platform 145 may communicate with the second (active) server to cause it to transition to standby mode.

Figure 3C:
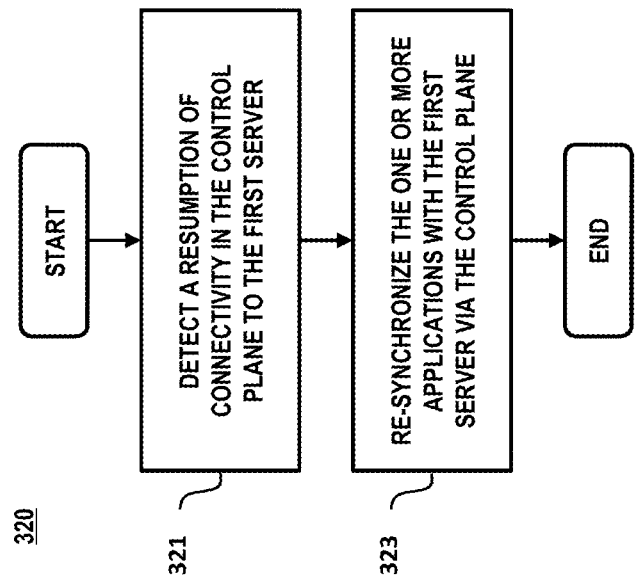
Figure 3B:
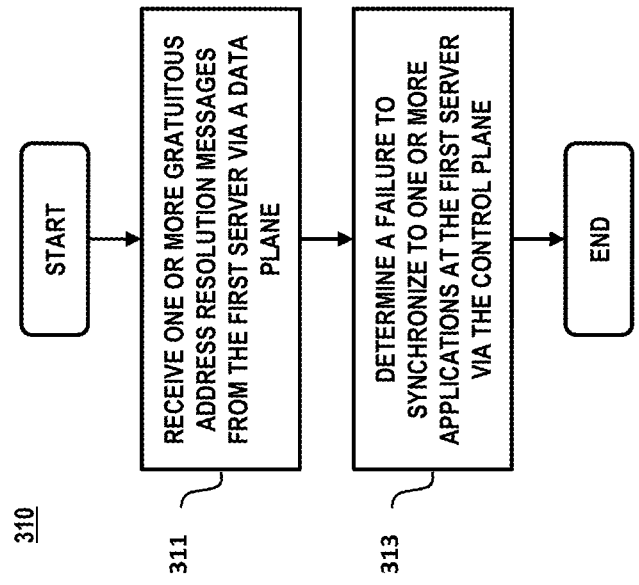

FIG. 3B illustrates a process 310 for diagnosing the cause of an attempt by the first (standby) server to transition to active mode, according to an exemplary embodiment. In step 311, the second (active) server may receive one or more gratuitous address resolution messages from the first (standby) server via a data plane. In one embodiment, diagnosis module 213 of failover platform 145 receives notification of the receipt of gratuitous address resolution messages from communication module 203. In step 313, the second (active) server may determine a failure to synchronize to one or more applications at the first (standby) server via the control plane. For instance, synchronization module 207 may notify diagnosis module 213 of a failure to replicate or duplicate application data to the first (standby) server. In one embodiment, diagnosis module 213 utilizes the notifications to determine that the first (standby) server is attempting to transition to an active mode because it cannot communicate with the second (active) server via the control plane. In particular, diagnosis module 213 determines that the cause of the attempted transition is not due to an actual failure at the second (active) server. Instead, it is it being triggered because of loss of communication between the second (active) and first (standby) servers. If, as described above, the failover platform 145 is implemented as a separate system, the control plane fault may prevent the failover platform 145 from communicating with the second (active) server and forcing it to transition to standby mode. To avoid a scenario where both first and active servers are in active mode, the failover platform 145 may communicate with one or more other computer systems to remotely shutdown the second (active) server or shutdown the port on the switch (e.g., switch 125a) the second (active) server is connected.

FIG. 3C illustrates a process 320 for re-synchronizing after the repair of a control plane fault, according to an exemplary embodiment. In step 321, the second (originally active) server detects, or is notified, that the control plane fault has been repaired. In one embodiment, communication module 203 of failover platform 145 notifies synchronization module 207, transition module 211, and recovery module 215 of the repair. In step 323, the second (originally active) server re-synchronizes its instance of the application with the other servers (including the first (originally standby) server) via the repaired control plane. In one embodiment, control plane repairs automatically trigger synchronization module 207 to check whether data or state information needs to be re-synchronized. As described earlier, synchronization module 207 may save application data and state information to local storage during a fault. In one embodiment, step 323 may involve reconciling or synchronizing the stored information with the latest data and state information received via the control plane.

Figure 3D:
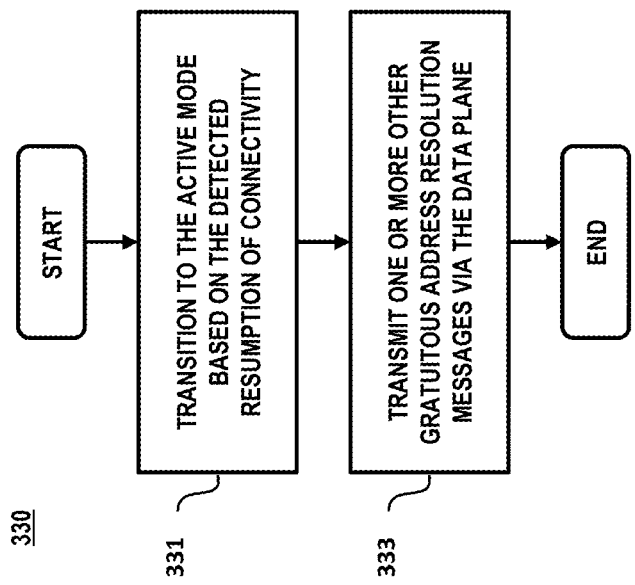

FIG. 3D illustrates a process 330 for recovering from a control plane fault, according to an exemplary embodiment. In step 331, the second (originally active) server transitions back to an active mode based on the detected resumption of connectivity via the control plane. For instance, recovery module 215 of failover platform 145 may utilize transition module 211 to restore the originally active server back to its role as the active server. In step 333, the second server transmits one or more gratuitous address resolution messages to the other servers via the data plane. In one embodiment, the gratuitous address resolution messages are gratuitous ARP messages that force network devices and the other servers to update the address resolution cache information for a virtual network address of the application service. The updated information may include a hardware address of the second server.

Figure 4:
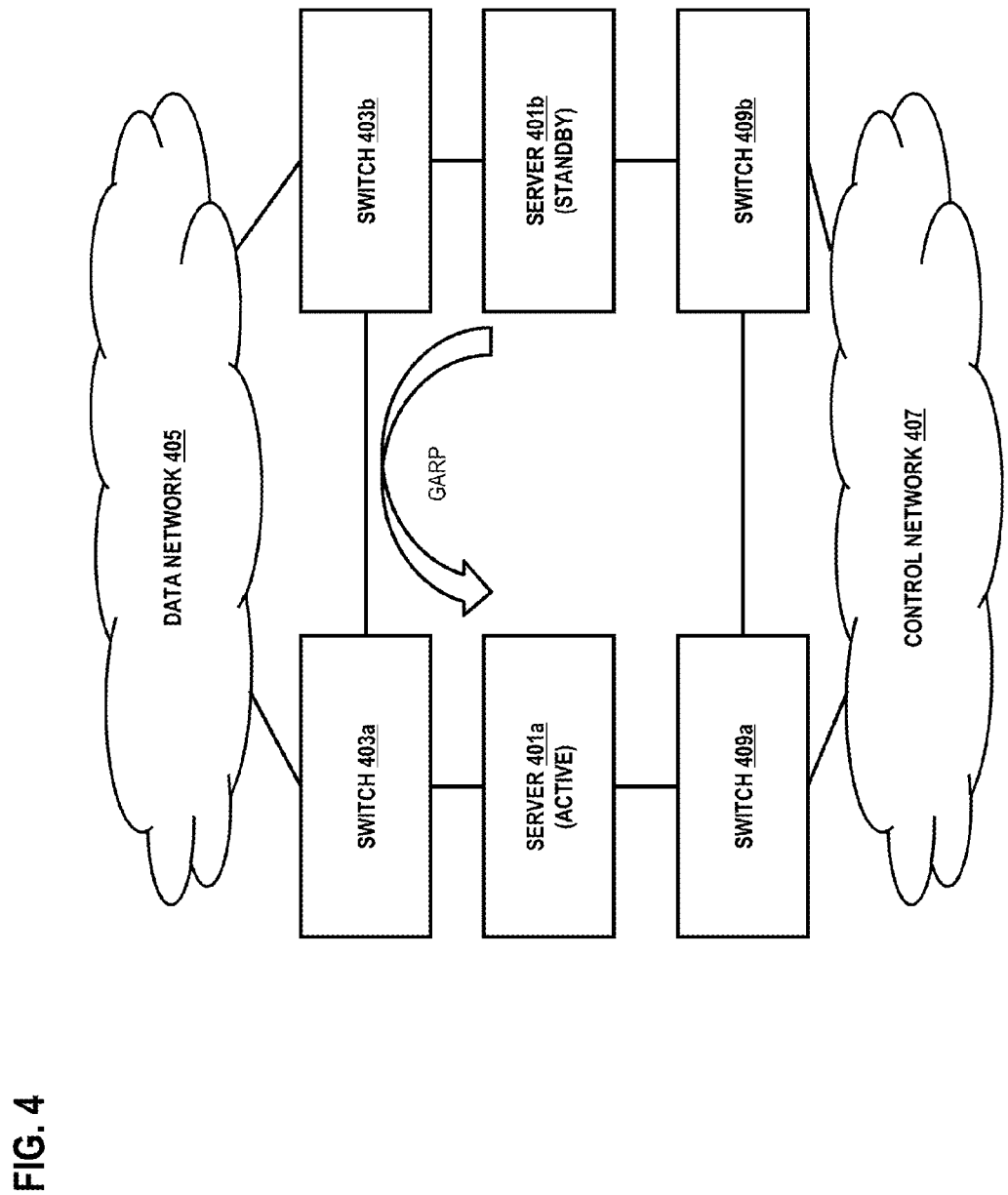
FIG. 4 is a diagram of a high-availability server configuration capable of efficient failover detection and recovery, according to an exemplary embodiment.

FIG. 4 is a diagram of a high-availability server configuration capable of efficient failover detection and recovery, according to an exemplary embodiment. In one embodiment, servers 401a and 401b (collectively referred to as servers 401) host an application service accessible via LAN switches 403a and 403b (collectively referred to as switches 403). Data network 405 may include a high-speed LAN network that connects to the public Internet via one or more access and intermediate transport networks (not shown). Servers 401 may also be connected to each other via a second control network 407 that is utilized for operations and management traffic (e.g., replication, status information exchange, etc.). Control network 407 may employ LAN switches 409a and 409b. Alternatively, the servers 401 may be directly connected to each other if, for instance, there are only two servers. In one embodiment, servers 401 operate as part of a high-availability architecture such that only one server is actively responding to client requests at any one time. As shown, server 401a is currently the active server and server 401b is the standby server. In one embodiment, the standby mode is a "hot" standby with respect to the application. For instance, server 401a may fully synchronize to server 401b. In one embodiment, server 401a performs synchronous replication of all data and synchronizes an execution checkpoint for the application to that of the standby server 401b. Server 401b may monitor itself and the state of server 401a. If, for any reason, server 401b determines that server 401a is no longer available or that the instance of the application executing at server 401a cannot respond to client requests, server 401b transitions or "fails over" to active mode. In another embodiment, the standby mode may be a "warm" standby. For example, a failover may involve some loss of data because all the application data and state information is not fully replicated between the servers.

In accordance with an exemplary embodiment of the present disclosure, server 401a may diagnose a control plane fault as being a cause of the receipt of a gratuitous ARP message ("GARP") via data network 405. As described earlier, a gratuitous ARP message may be seen as an attempt by a server to transition to active mode because it indicates an attempt to actively respond to client access requests based on a virtual IP address. For example, a fault affecting control network 407 may be diagnosed as the reason why standby server 401b is attempting to transition to an active mode. In such a scenario, active server 401a may failover to standby mode and allow server 401b to stably transition to active mode. When connectivity via control network 407 resumes, server 401a may attempt to revert back to active mode by sending another set of gratuitous ARP messages onto data network 405. In one embodiment, the decision to revert back to active mode may be determined by the control logic 201 of the failover platform 145 based on the state of the network links. For instance, the control logic 201 may determine that the servers would become unstable if server 401a reverts back to active mode (e.g., due to flapping or continuous failover). To prevent instability, the control logic 201 may determine to leave the servers in the failed over state and wait for manual reconfiguration.

Figure 5:
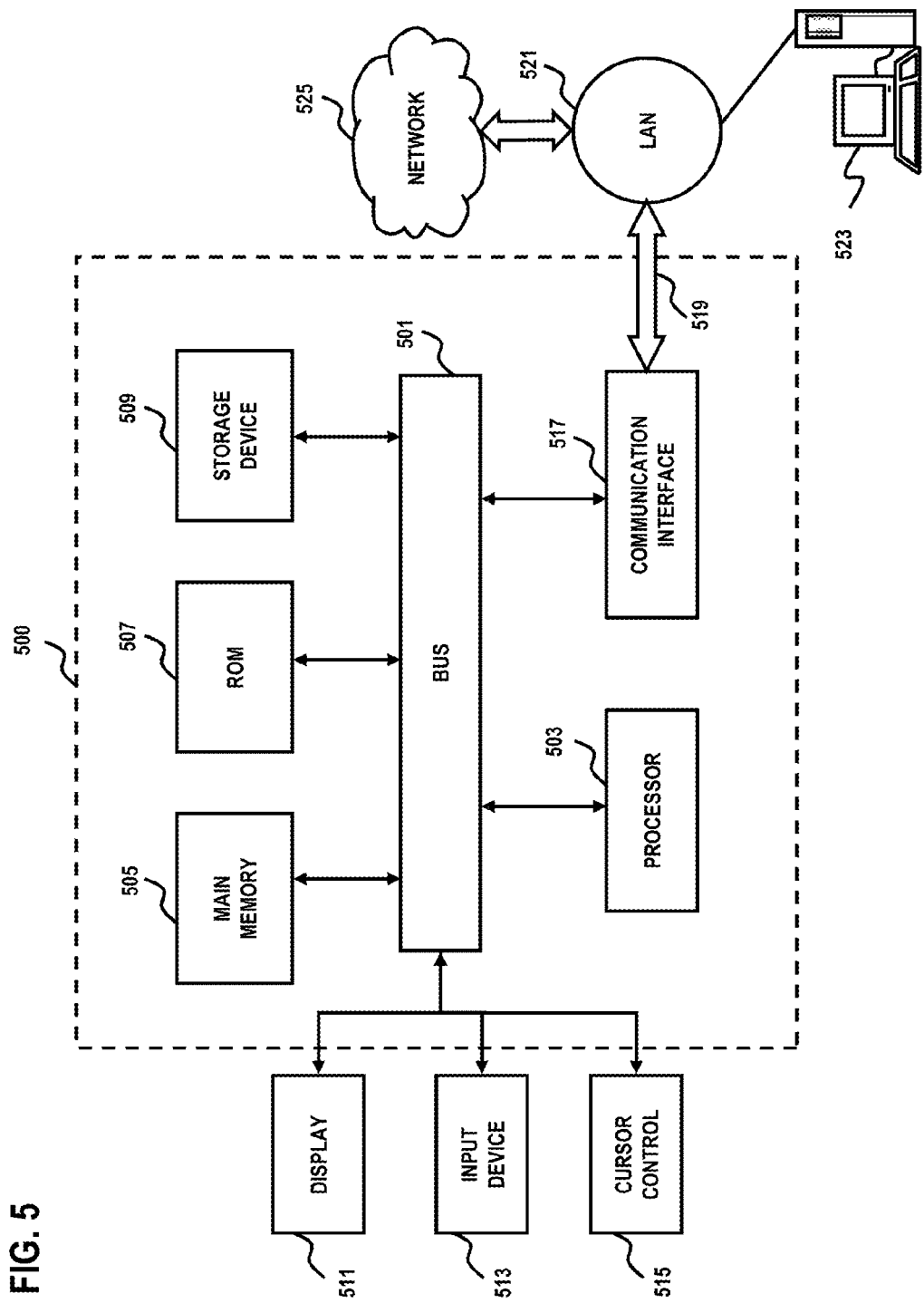
FIG. 5 is a diagram of a computer system that can be used to implement various exemplary embodiments.

FIG. 5 illustrates computing hardware (e.g., computer system) upon which an embodiment according to the invention can be implemented. Computer system 500 includes a bus 501 or other communication mechanism for communicating information and a processor 503 coupled to bus 501 for processing information. Computer system 500 also includes main memory 505, such as random access memory (RAM) or other dynamic storage device, coupled to bus 501 for storing information and instructions to be executed by processor 503. Main memory 505 also can be used for storing temporary variables or other intermediate information during execution of instructions by processor 503. Computer system 500 may further include a read only memory (ROM) 507 or other static storage device coupled to bus 501 for storing static information and instructions for processor 503. A storage device 509, such as a magnetic disk or optical disk, is coupled to bus 501 for persistently storing information and instructions.

Computer system 500 may be coupled via bus 501 to a display 511, such as a cathode ray tube (CRT), liquid crystal display, active matrix display, or plasma display, for displaying information to a computer user. An input device 513, such as a keyboard including alphanumeric and other keys, is coupled to bus 501 for communicating information and command selections to processor 503. Another type of user input device is a cursor control 515, such as a mouse, a trackball, or cursor direction keys, for communicating direction information and command selections to processor 503 and for controlling cursor movement on display 511.

According to an embodiment of the invention, the processes described herein are performed by computer system 500, in response to processor 503 executing an arrangement of instructions contained in main memory 505. Such instructions can be read into main memory 505 from another computer-readable medium, such as storage device 509. Execution of the arrangement of instructions contained in main memory 505 causes processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

Computer system 500 also includes a communication interface 517 coupled to bus 501. Communication interface 517 provides a two-way data communication coupling to a network link 519 connected to a local network 521. For example, communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

Network link 519 typically provides data communication through one or more networks to other data devices. For example, network link 519 may provide a connection through local network 521 to a host computer 523, which has connectivity to a network 525 (e.g. a wide area network (WAN) or the global packet data communication network now commonly referred to as the "Internet") or to data equipment operated by a service provider. Local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

Computer system 500 can send messages and receive data, including program code, through the network(s), network link 519, and communication interface 517. In the Internet example, a server (not shown) might transmit requested code belonging to an application program for implementing an embodiment of the invention through network 525, local network 521 and communication interface 517. Processor 503 may execute the transmitted code while being received and/or store the code in storage device 509, or other non-volatile storage for later execution. In this manner, computer system 500 may obtain application code in the form of a carrier wave.

The term "computer-readable medium" as used herein refers to any medium that participates in providing instructions to processor 503 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set 600 upon which an embodiment of the invention may be implemented. Chip set 600 is programmed for failover detection and recovery as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of FIGS. 3A through 3D.

In one embodiment, chip set 600 includes a communication mechanism such as a bus 601 for passing information among the components of chip set 600. Processor 603 has connectivity to bus 601 to execute instructions and process information stored in, for example, a memory 605. Processor 603 may include one or more processing cores with each core configured to perform independently. A multi-core processor enables multiprocessing within a single physical package. Examples of a multi-core processor include two, four, eight, or greater numbers of processing cores. Alternatively or in addition, processor 603 may include one or more microprocessors configured in tandem via bus 601 to enable independent execution of instructions, pipelining, and multithreading. Processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 603 and accompanying components have connectivity to memory 605 via bus 601. Memory 605 includes both dynamic memory (e.g., RAM, magnetic disk, writable optical disk, etc.) and static memory (e.g., ROM, CD-ROM, etc.) for storing executable instructions that when executed perform the inventive steps described herein for failover detection and recovery. Memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting an attempt by a first server to transition from a standby mode to an active mode;
   diagnosing a loss of connectivity to the first server in a control plane as a cause of the attempt;
   transitioning to a standby mode based on the diagnosed cause of the attempt;
   receiving one or more gratuitous address resolution messages from the first server via a data plane; and
   determining a failure to synchronize to one or more applications at the first server via the control plane,
   wherein the attempt is detected based on the one or more gratuitous address resolution messages.

2. The method of claim 1, further comprising:
   detecting a resumption of connectivity via the control plane to the first server; and
   re-synchronizing the one or more applications with the first server via the control plane.

3. The method of claim 2, further comprising:
   transitioning to the active mode based on the detected resumption of connectivity; and
   transmitting one or more other gratuitous address resolution messages via the data plane.

4. The method of claim 1, wherein the control and data planes correspond to respective first and second communication links to the first server.

5. The method of claim 1, wherein the one or more gratuitous address resolution messages comprise one or more virtual network addresses shared by the first server and a second server.

6. The method of claim 5, wherein the one or more virtual network addresses are shared virtual Internet protocol (IP) addresses.

7. The method of claim 1, wherein the first server hosts the one or more applications with a second server.

8. An apparatus comprising at least one processor configured to:
   detect an attempt by a first server to transition from a standby mode to an active mode;
   diagnose a loss of connectivity to the first server in a control plane as a cause of the attempt;
   transition to a standby mode based on the diagnosed cause of the attempt;
   receive one or more gratuitous address resolution messages from the first server via a data plane; and determine a failure to synchronize to one or more applications at the first server via the control plane, wherein the attempt is detected based on the one or more gratuitous address resolution messages.

9. The apparatus of claim 8, wherein the apparatus is further configured to:

detect a resumption of connectivity via the control plane to the first server; and re-synchronize the one or more applications with the first server via the control plane.

10. The apparatus of claim 9, wherein the apparatus is further configured to:

transition to the active mode based on the detected resumption of connectivity; and transmit one or more other gratuitous address resolution messages via the data plane.

11. The apparatus of claim 8, wherein the control and data planes correspond to respective first and second communication links to the first server.

12. The apparatus of claim 8, wherein the one or more gratuitous address resolution messages comprise one or more virtual network addresses shared by the first server and a second server.

13. The apparatus of claim 12, wherein the one or more virtual network addresses are shared virtual Internet protocol (IP) addresses.

14. The apparatus of claim 8, wherein the first server hosts the one or more applications with a second server.

15. A system comprising:

a first server;

a second server;

a failover platform configured to:

detect an attempt by the first server to transition from a standby mode to an active mode, diagnose a loss of connectivity to the first server in a control plane as a cause of the attempt, transition to a standby mode based on the diagnosed cause of the attempt, receive one or more gratuitous address resolution messages from the first server via a data plane, and determine a failure to synchronize to one or more applications at the first server via the control plane, wherein the control plane connects the first and second servers via a first communication link and the data plane connects the first and second servers via a second communication link, and wherein the attempt is detected based on the one or more gratuitous address resolution messages.

16. The system of claim 15, wherein the failover platform is further configured to:

detect a resumption of connectivity via the control plane to the first server; and re-synchronize the one or more applications with the first server via the control plane.

17. The system of claim 16, wherein the failover platform is further configured to:

transition to the active mode based on the detected resumption of connectivity; and transmit one or more other gratuitous address resolution messages via the data plane.

18. The system of claim 15, wherein the one or more gratuitous address resolution messages comprise one or more virtual network addresses shared by the first server and the second server.

19. The system of claim 18, wherein the one or more virtual network addresses are shared virtual Internet protocol (IP) addresses.

20. The system of claim 15, wherein the first server hosts the one or more applications with the second server.

* * * * *